Figure 9:
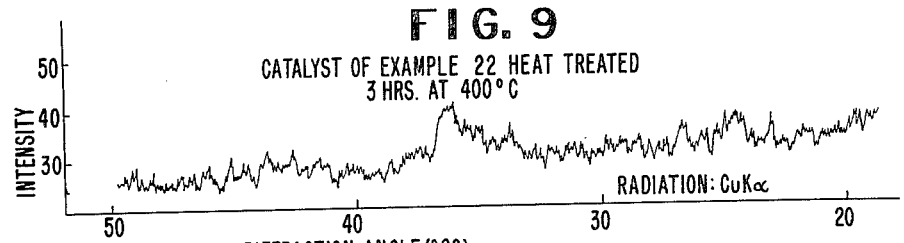

Nov. 9, 1965
B. W. HOWK ETAL
3,216,954
MANGANO-CHROMIA-MANGANITE CATALYST AND
PROCESS FOR ITS PRODUCTION
Filed May 19, 1961
3 Sheets-Sheet 1
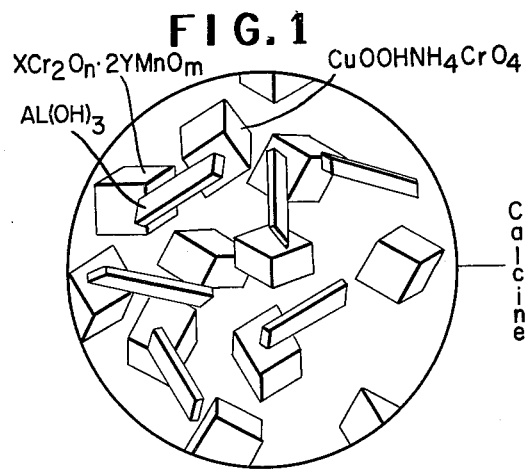
FIG. 1
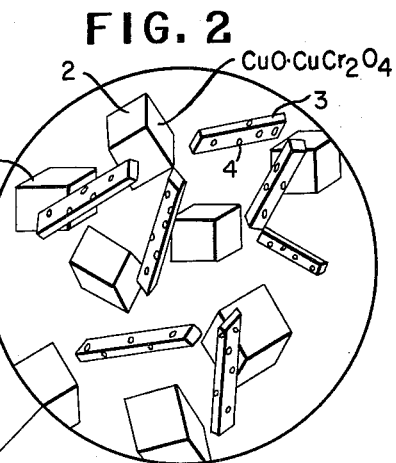
FIG. 2
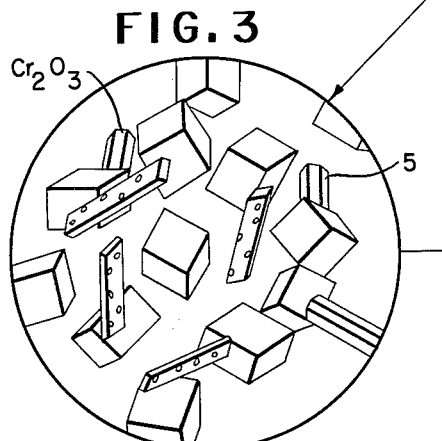
FIG. 3
FIG. 4
FIG. 6 - $CuOOHNH_4CrO_4$
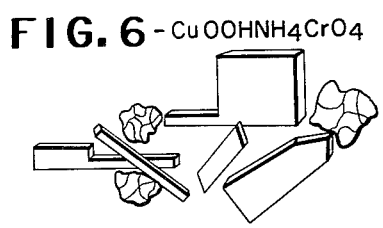
FIG. 8 - $Cr_2O_3$
FIG. 7 - $CuO \cdot CuCr_2O_4$
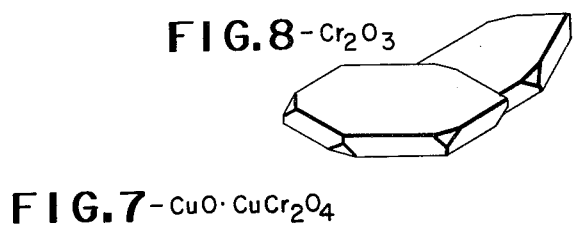
FIG. 5 - $Al_2O_3$
INVENTORS
ALVIN B. STILES
BENJAMIN W. HOWK
BY Albert B. Griggs
ATTORNEY

CATALYST OF EXAMPLE 22 HEAT TREATED 3 HRS. AT 400°C

CATALYST OF EXAMPLE 22 HEAT TREATED AT 600°C
CRYSTALLITE SIZE = 500 Å

CATALYST OF EX. 22 HEAT TREATED 3 HRS. AT 800°C
CRYSTALLITE SIZE = 500 Å

CATALYST OF EX. 22 AFTER ROAD TEST OF 15,815 MILES
CRYSTALLITE SIZE = 250 Å
LEAD CHROMATE

INVENTORS
ALVIN B. STILES
BENJAMIN W. HOWK

Nov. 9, 1965

B. W. HOWK ETAL
MANGANO-CHROMIA-MANGANITE CATALYST AND
PROCESS FOR ITS PRODUCTION 3,216,954

Filed May 19, 1961

3 Sheets-Sheet 3

INVENTORS
ALVIN B. STILES
BENJAMIN W. HOWK

BY Albert B. Griggs
ATTORNEY

United States Patent Office 3,216,954
Patented Nov. 9, 1965

3,216,954
MANGANO-CHROMIA-MANGANITE CATALYST
AND PROCESS FOR ITS PRODUCTION
Benjamin W. Howk, West Chester, Pa., and Alvin B. Stiles, Charleston, W. Va., assignors to E. I. du Pont de Nemours and Company, Wilmington, Del., a corporation of Delaware
Filed May 19, 1961, Ser. No. 109,483
16 Claims. (Cl. 252—465)

This application is a continuation-in-part of application Serial No. 59,392, filed September 29, 1960, now abandoned which is a continuation-in-part of application Serial No. 828,778, filed July 22, 1959, now abandoned.

This invention relates to the treatment of combustion products containing nitrogen oxides, carbon monoxide, and hydrocarbons, and is more particularly directed to mangano-chromia-manganite catalysts and their use for the catalytic conversion of components of automobile exhaust.

In the drawings:

FIGURES 1 through 4 are an artist's conception of the mode of association of the crystallites present in the preferred catalysts of the invention and in the successive figures the process of formation and the changes in crystallite groups is indicated.

FIGURE 5 shows $Al_2O_3$ not as the prismatic monoclinic crystals of the views above but as a pseudohexagonal monoclinic crystal which more accurately represents the habit of most of the crystallites as observed under the electronmicroscope, FIGURE 6 is a more accurate representation of the basic copper chromate which is shown as incompletely ordered particles whose outlines suggest various geometrical shapes together with some amorphous particles.

Figure 11:
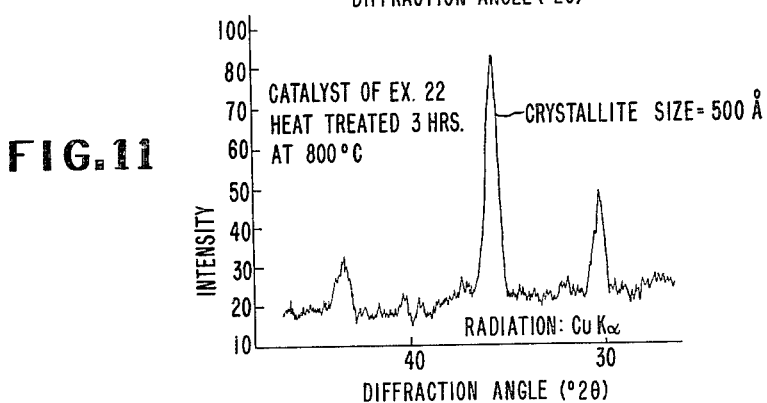
Figure 12:
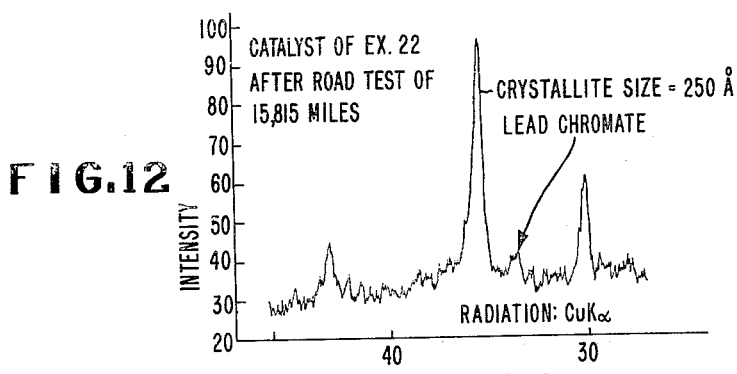
Figure 13:
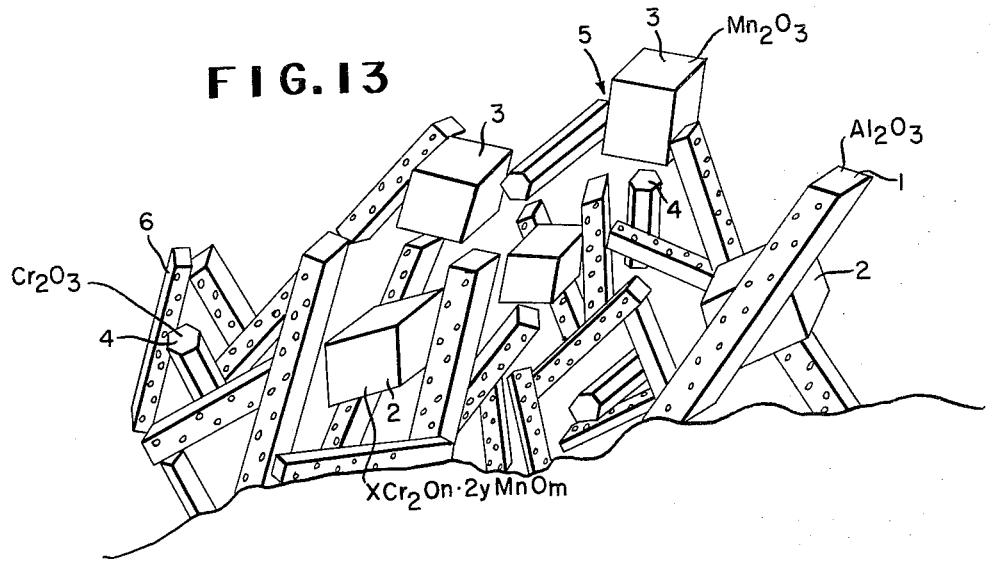
Figure 14:
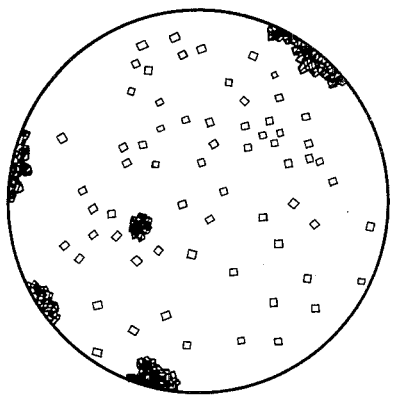

FIGURE 7 is a more detailed showing of the copper chromite cubes 2 in which the copper oxide is illustrated as flat crystallites disposed randomly about a $CuCr_2O_4$ cube, FIGURE 8 is a hexagonal crystal which represents a more probable appearance of the $Cr_2O_3$ of FIGURES 3 and 4, FIGURES 9 through 12 show the effect of various treatments upon crystallite size in catalysts of the invention, FIGURE 13 shows the mode of association of crystallites of catalysts of the invention with preferred supports, and FIGURE 14 is a drawing made from a photomicrograph showing the cube form of the spinels present in preferred catalysts of the invention.

According to the present invention mangano-chromia-manganite catalysts as more fully described below are used for the treatment of such exhaust and waste gases.

It is impractical to use catalysts that require a high exhaust gas temperature to initiate reaction because automobiles operate much of the time in city driving and at comparatively low exhaust temperatures. Catalysts of the present invention light-off at relatively low temperatures, even after extended use, so that they are practical and effective under ordinary conditions of motor vehicle operation. The mangano-chromia-manganite catalysts of the invention can also effectively be used to "fuse" the operation of catalysts which require a higher light-off temperature because the manganite catalysts begin operating at a low temperature and heat the catalyst bed and exhaust stream.

The determination of light-off temperature is difficult because it is not a definite figure but rather depends upon a variety of operating conditions such as gas composition, gas velocity, heat losses, and the like.

Light-off temperatures mentioned herein are determined arbitrarily by passing a 1% ethane gas over the catalyst and are defined as the temperature required to oxidize 90% of the ethane. This is taken as the light-off temperature because it is thought it will bear a close correlation to the actual temperature of light-off in operation.

Catalysts effective for treatment of such waste gases as are treated according to the invention are ordinarily extremely sensitive to water. Liquid water, as well as water vapor, is found in the exhaust gases of motor vehicles and in other such combustion systems. The liquid water causes spalling of the catalyst and weakens them mechanically so much that after very short periods of operation they are no longer useful. Catalysts of the present invention are quite resistant to damage from liquid water and water vapors.

Moderately effective systems have been devised for the handling of exhaust gases of motor vehicles providing the motors are operated on carefully selected fuels. A commercially satisfactory catalyst should be resistant to lead, sulfur, halogens, phosphates, boron, and their reaction products, and to hydrocarbon fuels and oils and their partial combustion products. Such a catalyst should also be resistant to manganese compounds which are sometimes used as antiknock agents. The catalysts of the present invention have remarkable resistance to such constituents often found in auto exhausts. They are also quite resistant to deactivation by high temperatures because of their composition and structure.

It is imperative that a satisfactory catalyst be effective for the oxidation or reduction of as many as possible of the numerous components in the waste gases being treated. The catalysts of the present invention are effective in converting the nitrogen oxides, carbon monoxide, the hydrocarbons, and other exhaust gas components and are thus broadly effective.

It will be noted that some catalysts of the invention are somewhat less effective in converting nitrogen oxides than others but they are nevertheless valuable for the conversion of carbon monoxide and hydrocarbons.

It will be seen that exhaust gases can be converted in a plurality of stages. Thus the reduction of nitrogen oxides can occur in a first stage and then oxygen can be added in the second stage for the oxidation of carbon monoxide and hydrocarbons. The same or different catalysts can be used in the two or in the plurality of stages.

An air compressor driven by the motor can be used for supplying an excess of 30% or more over that stoichiometrically required to react with the hydrocarbons and carbon monoxide. Alternatively, a Venturi can be used. As mentioned earlier, the addition of air at a later stage may assist in reaching a light-off temperature since the air if introduced sooner would otherwise have a cooling effect.

It is imperative that a satisfactory catalyst have a reasonably small volume so that it can conveniently be carried by a motor vehicle without requiring an unreasonable amount of room. Another practical consideration is that the catalyst should have a reasonably long service life, though this can be balanced somewhat against low cost. The catalysts of the present invention are relatively inexpensive, have a surprisingly long life, and are effective in relatively small amounts.

The novel catalysts of the invention and processes for their preparation can be described by reference to the drawing.

In FIGURE 1 of the drawing, there is shown a coprecipitate of mangano-chromia-manganite, $XCr_2O_n \cdot 2YMnO_m$, associated with a second catalyst exemplified by basic copper chromate, CuOOHNH$_4$CrO$_4$, and with an interspersant exemplified by aluminum hydroxide, Al(OH)$_3$. These first two products are represented in the figure as cubes and the last as monoclinic crystals. The probable form of the mangano-chromia-manganite is a cube as shown in the figures though it may assume other labile isometric configurations as will be discussed later. The copper chromate occurs in incompletely ordered particles whose outlines suggest various geometric shapes and there is some amorphous material present also as illustrated in FIGURE 6. The monoclinic crystals of aluminum oxide are better represented as in FIGURE 5 as pseudohexagonal crystals. The crystallites shown preferably have a size less than 50 Angstroms and are closely associated as shown in the figure.

The precipitate of FIGURE 1 is calcined and the basic copper chromate is converted to a less voluminous copper chromite. The aluminum hydroxide is converted to aluminum oxide as a result of the calcination. The groups of crystallites become somewhat more widely spaced so that the product is slightly more porous. The loss of water from the monoclinic crystals of aluminum hydroxide is illustrated in FIGURES 2, 3, and 4 by irregular pores. The crystals of FIGURE 5 similarly have such pores at their edges. The pores are not visible but are inferred.

The copper chromite of FIGURE 2 is shown in greater detail in FIGURE 7 as a mixture of solid phases in which the copper oxide, which is extractable from the chromite, is represented as separate small crystallites. The CuCr$_2$O$_4$ phase is represented as a cube.

To this product there is added a second interspersant such as chromic oxide which is shown in FIGURE 3 as hexagonal crystals. These go into interstices in the groups already described. The chromic oxide is shown in FIGURES 3 and 4 as hexagonal crystals but can also be represented as shown in FIGURE 8 as hexagonal crystals which have a (10$\bar{1}$1) face exposed on alternate corners as illustrated.

It is to be observed that the crystallites in the preferred catalysts of the invention are so small that direct observation is difficult. The shape is inferred from the known crystal habit of the materials involved and from the crystal forms which can be observed in products which have been heated until the crystallites are large enough to be seen in an electronphotomicrograph.

The product formed is heat-treated with most surprising results. The product becomes slightly weaker, if anything, wtih respect to mechanical shock but becomes more stable to spalling in the presence of liquid water. It is believed that the heat-treatment causes the groups of crystallites to become more compact as illustrated in FIGURE 4.

It will be understood that the illustrations are inferable from the data available and represent a present hypothesis as to the character and behavior of the crystallite groups during processes of the invention, but the invention is by no means to be limited by this hypothesis.

The process generally outlined just above and shown in the drawings with respect to one preferred catalyst will now be more fully described.

Catalysts of the invention are characterized by the use of mangano-chromia-manganite. This is composed of varying proportions of:

| MnO | Cr$_2$O$_3$ |
|---|---|
| MnO$_2$ | Cr$_2$O$_3$·MnO$_2$ |
| Mn$_2$O$_3$ | CrO·Mn$_2$O$_3$ |
| Mn$_3$O$_4$ | CrO$_3$·MnO |
| Cr$_2$O$_3$·MnO | |

In addition to the above oxides, a mangano-chromia-manganite catalyst quite possibly contains still other oxides of manganese, of chromium, and of chromium plus manganese which are not known compounds and which are not subject to positive identification by any means now available. Thus Mn$_2$O$_5$ may be present when the state of oxidation of the catalyst is high and other oxides of similar unusual character may also exist in a transitory and at this time unidentifiable form.

The complex product of the invention is chemically represented by the following:

$$XCr_2O_n \cdot 2YMnO_m$$

in which the weight ratio of Mn:Cr is 3:0.5 to 3:30. Thus Y=3, X=0.5 to 30.

Instead of the weight ratio, the atomic ratio can be used for it is almost the same. In the formula, $n$ can be 2, 3, and 6 and $m$ can be 1, 1.33, 1.5, 2, and 2.5.

While any of the mangano-chromia-manganites as described can be used in preparing catalysts according to the present invention, it is much preferred to use those in which the ratio of Y:X is either above 3:3 or below 3:2. The weight ratio of Y:X, that is Mn:Cr, is preferably 3:0.5 to 3:1.5 and 3:3.5 to 3:30. Mangano-chromia-manganites thus constituted are far more valuable and thermally stable as catalysts than those having a ratio of 3:2 to 3:3 and can be used even without the interspersants which will be described hereafter. If the ratio is around 3:2 to 3:3 interspersants must be used.

White chemically the mangano-chromia-manganites can be designated as above, it is to be understood that they include ionic crystals in which the crystals have the spinel structure. Each chromium ion may be thought of as surrounded by 6 oxygen ions and each manganese ion by 4 oxygen ions at the apexes of regular polyhedra having the metal ions at their centers. The spinel crystal structure is isometric and the crystals may assume the various forms characteristic of the isometric system such as cube, octahedron, dodecahedron, tetrahexahedron, trisoctahedron, trapezohedron, hexoctahedron and combinations of these.

The spinel structure generally can be represented as follows:

$$AB_2O_4$$

There are thus two kinds of cation sites:

A occupied by cations having an ionic radius of 0.7 to 0.9 angstroms,

B occupied by cations having an ionic radius of 0.4 to 0.7 angstroms.

In the partly ordered spinels of the mangano-chromia-manganites:

A is Mn$^{++}$, and

B is Cr$^{+++}$ and Mn$^{+++}$.

The cations present in the B sites can be present in various proportions and in different valence states depending upon the temperature and upon whether the spinels are in an oxidizing, neutral, or reducing atmosphere as long as the total charges on the cations are equal to 8, thus preserving electrical neutrality.

From theoretical considerations, though specific evidence is lacking, inverse spinels may also form in which B cations shift to A sites. Also, as the spinels of the mangano-chromia-manganites have defect structures, Mn$^{++++}$ can go into the B or A sites.

In addition to the spinel represented by AB$_2$O$_4$, the mangano-chromia-manganites contain other manganese and chromium oxides. It is this whole complex of shifting chemical character that is herein termed a mangano-chromia-manganite. In the occupancy of the A and B sites in the spinel structure the ions which occupy the sites under one set of conditions may by ionic diffusion be replaced by others under changing conditions of chemical concentrations, temperature, oxidation and reduction.

The labile and shifting character of the mangano-chromia-manganite is believed to lead to its high catalytic activity. The spinels are preferably in the labile isometric forms such as the cube, tetrahexahedron, trisoctahedron, and hexoctahedron. If the catalyst is heated to high temperatures the more stable forms develop such as the octahedron, dodecahedron, and trapezohedron. The cube is abundant in the preferred mangano-chromia-manganite catalysts of the invention. The cubes visible in a product which has been heated to a point at which they have grown to a size visible in an electronmicrograph are shown in FIGURE 14 of the drawings and is further described in connection with the examples.

Initially the observable discrete particles in mangano-chromia-manganite catalysts of the invention are cubes. The cubes are not visible even in an electronmicrograph in catalysts which have not been heated to high temperatures and they develop when the catalyst is heated to, say, 600° C. for 3 hours. It is reasonably inferable that the particles which thus grow were cubes at the beginning and have grown to larger cubes. As shown in FIGURE 14 and as described hereinafter, most of the discrete particles not in aggregates will be seen to be cubes in products of the invention. In preferred products generally the discrete particles, that is those particles which can be seen individually, should be cubes in about 10 or 15% or more of the particles of identifiable geometry, the remainder being amorphous or unidentifiable as to crystal shape. In the most preferred catalysts having crystallite particles under 50 angstroms there will initially, that is before use of the catalyst, be substantially no mangano-chromia-manganite particles of identifiable geometry by present day electronmicrograph techniques. Of course in use, especially at high temperatures, the various other isometric forms will develop as described above.

It will be understood that the shifting character of the spinel, $AB_2O_4$, can extend, particularly at higher temperatures, so that interspersants and co-catalysts enter into the spinel. Thus the A sites can contain $Cu^{++}$, $Fe^{++}$, $Co^{++}$, $Ni^{++}$, $Zn^{++}$, and other co-catalysts and interspersant metals of appropriate size. Similarly in the B position there can be $Al^{+++}$, $Fe^{+++}$, and other catalyst and interspersant metals of appropriate size. The spinel which exists at higher temperatures when there are co-catalysts and interspersants present can thus be designated with respect to the metals just named:

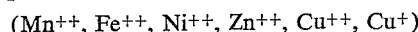
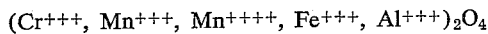

in which the ratio Mn:Cr equals 3:0.5 to 3:30.

Inverse spinels can also form in which part of the B cations shift to A sites, thus having 4 coordinated oxygen atoms, and A cations shift to B sites, thus having 6 coordinated oxygen atoms.

If the Mn:Cr ratio of the mangano-chromia-manganites is near the upper or lower regions of the ranges shown there will be crystallites of manganese oxides or of chromium oxides respectively in which the manganese and chromium are not associated with the other element in a spinel or other ionic crystal but as temperatures go up and as the environment changes there will be shifts or interactions which can bring these into association in various such crystal structures. Even at lower temperatures such excesses of the manganese and chromium oxides serve valuable functions and for our purposes are regarded as part of the mangano-chromia-manganite ionic crystal system. It is noted accordingly that the artist's representation in FIGURES 1 and following of the ionic crystal as a cube is idealized and, particularly at lower temperatures and with an exces of either manganese or chromium, there will be separate crystallites of their oxides.

While reference is made above to the ionic crystals which occur in the catalysts of the invention it will be understood that these develop upon heating of the mangano-chromia-manganite precursors which are formed by pyrolysis of the precipitate or of fused salts as herein described. Ordinarily, as will be seen later, the spinels will be developed by a further calcination to temperatures ranging up to about 500° C. After this treatment the crystallites of the mangano-chromia-manganite grow and will finally become visible in an electronmicrograph and identifiable by X-ray techniques. Sometimes it may be desirable to put the catalysts into service even before such calcination or after only partial calcination, in which event the heating which occurs in use will further develop the ionic crystals.

The term "mangano-chromia-manganite" does not have a recognized chemical meaning but is used herein to designate the complex products above described in general terms and hereafter stated in more detail. A general method for the preparation of catalysts by co-precipitation of a manganous compound with a chromium compound is shown in Wortz U.S. Patent 2,108,156 and the products are designated as "manganese chromites." This designation can be used for the catalysts of the invention when the Mn:Cr ratio is 3:2 but as has been described above it does not accurately reflect the complex character of the product even at this ratio. At other ratios it is even less accurate.

A mangano-chromia-manganite catalyst as prepared above has crystallites which are largely in the form of cubes. They are very small but if the catalyst as prepared, prior to pelleting, is heated at 600° C. for three hours and then prepared for an electronmicrograph in the usual way the electronphotomicrograph appears as in FIGURE 14. Substantially all of the discrete particles are cubes.

The mangano-chromia-manganites used according to the invention are preferably prepared in aqueous media by a reaction of a water-soluble manganese salt and a water-soluble chromium compound, preferably chromic acid anhydride.

The manganese salts can be such compounds as manganese chloride, manganese nitrate, manganese acetate, manganese sulfate, and in general any salt of manganese. The chromium compounds can be such compounds as chromium nitrate, chromium sulfate, chromic acid, ammonium chromate, and ammonium dichromate.

The manganese salt and the chromium salt are used in proportions to give the desired ratios as above described.

If ammonia or another precipitant is to be used which forms water-soluble chromates it will be evident that the water-soluble compounds of chromium, if in the hexavalent state, should not be used in excess of stoichiometric amount which will react with the maganese salt for where ammonia, or the like, is added later it will form a water-soluble ammonium chromate. If it is desired to obtain ratios higher than stoichiometric, these can be obtained by subsequent addition of the ammonium chromate salts.

When the soluble compounds of manganese and chromium are brought together in aqueous solution they, of course, form a precipitate after sufficient ammonia has been added. Other precipitants can be used such as ammonium chromate and calcium hydroxide, magnesium hydroxide, barium hydroxide, and other bases which will not interfere with the action as a catalyst. However, ammonium hydroxide is inexpensive and is quite effective and is ordinarily satisfactory. The ammonia can readily be eliminated from the product by heating.

The mangano-chromia-manganite precipitates preferred according to the invention have a crystallite size no greater than 1000 angstroms. Preferred catalysts can have a greater crystallite size as hereinafter discussed. The fact that the mangano-chromia-manganite is crystalline in form can be determined by conventional X-ray analytical techniques as can the order of crystallite dimensions. A suitable method is shown in X-ray Diffraction Procedures by H. P. Klug and L. E. Alexander, published by John Wiley & Sons, New York, 1954 edition. The preferred mangano-chromia-manganites of the invention have a crystallite size ranging downwardly from about 50 angstroms or more broadly from about 400 angstroms. The size will fall in the range below that figure and down to sizes where only a few molecules are associated but enough to establish a crystal pattern. The structure is inferable from electron diffraction, X-ray diffraction, or electronmicrograph, the most applicable method being dependent upon the crystallite size. Examples of X-ray diffraction patterns are shown in the drawings and described in Example 22.

It is to be noted that X-ray diffraction and electron diffraction are not too informative if a particular catalyst contains large crystallites as well as small crystallites of the catalytically active materials. The large crystallites obscure the presence of the small which may nevertheless be present in amounts sufficient to make the catalyst satisfactorily effective—say even as low as 5 to 10%. In this event, crystallite size must be determined by another method such as electron micrograph. Thus there is no objection to having large crystallites present in a catalytic aggregate of the invention providing only that there are a sufficient number of crystallites in the size ranges herein described so that the catalyst is suitably active and so that the interspersants are effective. In other words, crystallites of mangano-chromia-manganite, co-catalyst, and interspersants which are present in sizes well outside of the preferred ranges can be regarded as diluents which are largely inert and if not present in too large amount are not objectionable.

After catalysts have been in use for some time the crystallite size rises to considerably higher figures. When the size has risen to about 900 angstroms the catalyst will be about one-half as effective as when it was put in service with a crystallite size around 50 angstroms. One may initially use a catalyst in which the crystallites have a size up to 1000 angstroms with a loss of effectiveness which can be compensated by using a larger amount of catalyst. Of course, the effectiveness drops off with further use and such catalysts are less desirable economically than those of smaller crystallite size as noted.

While it is greatly preferred to use mangano-chromia-manganite catalysts in which the crystallite size is initially below 1000 angstroms and after use is still below 1000 angstroms, economics will sometimes justify the use of catalysts with larger crystallite sizes. Thus a mangano-chromia-manganite of low Mn:Cr ratio and containing no added interspersant can be made quite inexpensively and after heating to about 800° C. for three hours or so will have a crystallite size by X-ray of around 1500 angstroms. Even such a product shows considerable activity. Even higher crystallite sizes up to 2000 or even 2500 angstroms or even higher can be used if low activity can be offset by other advantages such as low cost or if high reaction temperatures can be used. These are not, however, the most preferred catalysts of the invention.

It is noted that when it is said that crystallite size is less than 50 angstroms, this means that using the X-ray of electronmicroscope techniques now available one obtains this apparent crystallite size determination. Actually some workers might obtain a figure of the order of, say, 60 or 75 angstroms using the same techniques and the same sample.

The mangano-chromia-manganite can be prepared in other ways as by making a mixture of salts of the manganese and chromium in the desired ratio and in very finely divided form and calcining. Any of the compounds above mentioned can be used. Thus, manganese chloride, manganese nitrate, manganese acetate, manganese sulfate, and other manganese salts can be used. Similarly chromium nitrate, chromium sulfate, chromic acid, ammonium chromate, and ammonium dichromate can be used. Additionally, manganese oxides, including common ores such as pyrolusite, can be used with the various chromium salts mentioned and manganese carbonate and manganese oxalate. In addition to the chromium compounds shown, one can of course use other salts or ores such as chromium sesquioxide, $Cr_2O_3$, chromylchloride, chromylnitrate, and other such chromium compounds.

Catalysts according to the present invention can be composed essentially of mangano-chromia-manganite prepared as above and containing an interspersant as described below. It is preferred, however, that it be promoted and further modified with a second interspersant as described below.

Preferred catalysts of the invention contain a second catalyst in addition to the mangano-chromia manganite. This can be any catalyst or mixture which has value in treating the gases converted according to the invention such as lead chromate, magnesium chromate, barium chromate, and strontium chromate. It is preferred to use base metal catalysts which are base metal chromites of

| Copper | Cadmium |
| Nickel | Cobalt |
| Iron | Tin |
| Zinc | Bismuth |

A co-catalyst can be selected from those shown in Lazier U.S. Patent 1,964,001 and the combination of mangano-chromia-manganite with the co-catalyst can be prepared as generally there described. However, it is suggested in the patent that a chromite mixture be heated to temperatures to make a mixed oxide-chromite product at temperatures in excess of 600° C. and this will result in sintering and reduction of catalytic efficiency. This aspect of the teachings of the patent should not be followed in making preferred catalysts of the present invention.

The base metal catalyst chromites are prepared in the same general manner as above decribed for mangano-chromia manganites. Thus a water-soluble salt of one of the base metals as above mentioned is dissolved in the same solution with the manganese and chromium compounds as originally described and coprecipitated with them. The soluble salts can be the chlorides, sulfates, acetates, or nitrates of any of the base metals mentioned. Again, the amount of the chromium compound disolved should of course be adequate to produce a proper ratio with the base metal. This should be a stoichimoetric amount.

The precipitants mentioned above for precipitating mangano-chromia manganite, such as ammonia, can at the same time effect coprecipitation of the base metal catalyst.

The crystallite size of the catalyst precipitate should be in a size range as already described for the mangano-chromia-manganite precipitate and as there stated should preferably be no greater than 1000 angstroms and is preferably under 400 angstroms and, even better, is less than 50 angstroms.

Instead of being coprecipitated with the mangano-chromia manganite, the base metal precipitate can be separately formed by use of a stoichiometric amount of the chromium compound and precipitation as with ammonium hydroxide or anhydrous ammonia. The two slurries thus formed can be brought together or the precipitates separately prepared can be dried, calcined and thereafter mixed. This latter, however, is not a preferred practice.

The proportions of manganite to the base metal catalyst can be widely varied. Generally the ratio of manganese to base metal should be about 1:1 and can range from 1:10 to 10:1 or even higher.

The process conditions used in the precipitation of mangano-chromia manganite and, if used, the base metal catalyst should be controlled in order to obtain crystallites in the size range already indicated. Those skilled in the art are familiar with the process variable which result in differing particle sizes and so there is no great difficulty in obtaining crystallites of the sizes desired. In general, it may be said that to obtain small crystallites a comparatively low temperature is preferred, say room temperature, or a solution may even be cooled somewhat, particularly in warm weather. The presence of local over-concentration of the anhydrous ammonia or other precipitant should be avoided by rapid stirring or agitation. Again, this is well understood in the art. When it is understood what result is to be obtained, one skilled in the art can readily achieve it.

The precipitation should also be effected from a comparatively dilute solution. Ordinarily there should be used about one molar concentration with respect to the water, of the manganese salt, the chromium compound, the copper compound, and other materials to be coprecipitated. If much higher concentrations are used there is a tendency to favor the production of larger crystallites. Dilute solutions are also valuable because occlusion of impurities is minimized.

It will be understood that while the crystals are formed in the particle sizes desired, they precipitate as aggregates and agglomerates of loosely associated crystallites which can be separated from water as by filtration, centrifugation, or decantation.

While reference has been made above primarily to the use of co-catalysts which are coprecipitated chromates, it will be understood that catalytic metals can be added to the mangano-chromia-manganite catalyst systems of the invention in various forms. Thus they can be added as the oxides, carbonates, acetates, oxalates, or in any other form in which they have catalytic activity or can develop catalytic activity upon calcination. Thus compounds such as the following can be used as precipitates which are formed separately though in every instance it is preferable that they be in a particle size range such that the crystallite size is as described herein:

| Copper oxide | Cadmium oxide |
|---|---|
| Nickel oxide | Tin oxide |
| Iron oxide | Bismuth oxide |
| Zinc oxide | Manganese oxide or dioxide |

As just noted above, the corresponding hydroxides can be used.

The mangano-chromia-manganite particles in catalysts of the invention have a tendency to grow in size. This growth occurs either by crystallite growth or by agglomeration, and the tendency is particularly great in use when the catalysts are heated to elevated temperatures. The mangano-chromia-manganite particles also have a tendency to agglomerate with the base metal catalyst, though this is not perhaps as great as the tendency to crystal growth.

To hinder such growth, preferred catalysts of the invention contain interspersants. These are comparatively inert particles of size comparable to that of the crystallites of the mangano-chromia-manganite. As seen in FIGURES 1 and 2 of the drawing, the interspersant, aluminum hydroxide, is intimately associated with the manganite and chromate coprecipitate illustrated and being of a different crystal habit and size hinders agglomeration and crystallite growth in later phases of the catalyst preparation and use.

The interspersant has the function as will be seen and which will be discussed further of keeping the crystallites of the catalyst and the co-catalyst apart. The interspersant could somewhat less aptly be called a dissident and they are randomly distributed among the crystallites of the catalysts. Generally, it may be said that the interspersant can be any refractory material, the crystallites of which are similar in size to those of the mangano-chromia-manganite. The interspersed refractories should have a melting point above 1000° C. and more preferably above 1600° C.

The interspersants which can be used include such water-insoluble precipitates as:

(1) Aluminum oxide and hydroxide
(2) Titania
(3) Thoria
(4) Ceria
(5) Chromia
(6) Magnesia
(7) Calcium oxide and hydroxide
(8) Barium oxide and hydroxide
(9) Strontium oxide
(10) Zinc oxide
(11) Manganese oxide
(12) Silica
(13) Beryllia
(14) Zirconia
(15) Lanthana
(16) Hafnia Aluminum hydroxide, which is present as oxide in the final product is preferred. Manganese oxide and chromia are listed as interspersants to be added in amounts exceeding those which would be present in the mangano-chromia-manganite of the ratios described.

Other insoluble compounds of the above metals can be similarly used such as barium chromate, calcium chromate, chrome oxides, calcium silicates, barium silicates, and magnesium aluminate. There can be used still other such insoluble compounds of the metals listed such as barium titanate, calcium titanate, manganese carbonate, aluminum chromite, magnesium, calcium, strontium and barium as silicates, aluminates, titanates, zirconates, and cerates.

It will be understood that some of the interspersants especially excesses of manganese oxide and chromia will have catalytic activity of their own, though this is not the primary reason for including them in the aggregates of the invention.

If the catalysts are to be used at temperatures which can be closely controlled and will not greatly exceed 700° C., silica can be used as an interspersant. Silica can be used in the form of any of the finely divided colloidal products such as silica sols or aerogels in which it is commercially available.

It will be understood that while the interspersant will normally be in the form of the oxide in the final catalyst aggregate after calcination, the crystallites can be introduced in the form of heat-decomposable salts. They can be formed in situ in the presence of the mangano-chromia-manganite catalyst and in the presence of the co-catalyst. Such heat-decomposable products can be used as:

(1) Aluminum nitrate
(2) Thorium nitrate
(3) Cerium nitrate
(4) Chromium nitrate
(5) Calcium hydroxide, nitrate and acetate
(6) Barium hydroxide and nitrate
(7) Manganese nitrate
(8) Zinc nitrate
(9) Strontium nitrate, hydroxides, acetates, and carbonates
(10) Magnesium nitrate, acetate
(11) Lanthanum nitrate
(12) Zirconyl nitrate Particles which can readily be introduced in the form of sols or dispersions in addition to those already listed above are:

(1) Magnesium oxide and hydroxide
(2) Titanium oxide, sol and gel
(3) Aluminum alcoholates
(4) Zircon powder
(5) Aluminum hydroxide gel
(6) Zirconia gel
(7) Cerium oxide
(8) Silica sol
(9) Zinc oxide and hydroxide
(10) Strontium hydroxide and oxide The ultimate particle size of the interspersants is as already described for the mangano-chromia-manganite precipitates above and is preferably less than 1000 angstroms, preferably not more than 400 angstroms, and it is still more preferred that the size be less than 50 angstroms. Precipitates may be amorphous or crystalline, and for the purposes of the present invention this is comparatively unimportant so long as the ultimate particle size is of the correct order.

The methods of production of interspersants in suitable form requires no extended discussion because the preparation of colloidal dispersions of these types is well understood.

The intespersant can be used in widely varying amounts and can range from, for example, 5% to, say, 75% based upon the total weight of solids in the final precipitate or mixture of mangano-chromia manganite plus base metal catalyst, if there is one present.

The coprecipitates or mixtures prepared as above are then calcined to produce a somewhat more porous structure as illustrated in FIGURE 2 of the drawings. The basic copper chromate, for example, loses water and tends to make the product more porous. The alumina loses water. The foraminant structure is maintained by the presence of the interspersant.

Calcination can be conducted at any of a wide range of temperatures from about 350° C. up to 500° C. or even higher. The temperature should in any event be below that at which sintering occurs and it should be sufficiently high to effect decomposition of the hydrates present.

After calcination, products as prepared above have somewhat open structure as described. They are preferably stabilized by the introduction into the structure of a second interspersant which is a refractory of a particle size suitable for such introduction. Thus chromic oxide, magnesium hydroxide and any of the interspersants as above described are introduced as a sol or a water-soluble salt which can be decomposed in situ.

For formation in situ one can use such water-soluble salts as those previously described as interspersants. It will be understood that the catalyst aggregates of the invention will contain the interspersants in a form of oxides because of the calcination which is part of the process of preparing such aggregates.

The particles of the second interspersant should preferably be within the size ranges previously described. Thus the particles should have a size under 1000 angstroms, preferably not greatly in excess of 400 angstroms and even better should be no longer than 50 angstroms. Some such particles can be included which are larger, but they will serve more as supports than as second interspersants. It is observed that the second interspersant is ordinarily added after the catalyst aggregate has taken form and has been dried. Such second interspersants can also be termed "structural stabilizers."

The second interspersant can range in amount from 0.5% to 50% or so by weight of the combined weight of catalyst including the first interspersant.

In FIGURE 3 a typical interspersant, chromic oxide, is illustrated as a hexagonal crystal. It will be seen to fill interstices in the groups of particles.

When crystallite or particle size is mentioned it will be understood that the size intended is the average of the largest dimension. This is measured by X-ray or, for larger particles, or for mixtures of sizes, can be measured and counted in an electron micrograph.

It is to be observed that the crystallite size of interspersants and of the catalyst, as well as of the mangano-chromia-manganite should all be below 1000 angstroms and more preferably below 400 angstroms, and even better under 50, as described generally elsewhere. It is further to be noted that it is advantageous to select an interspersant, a catalyst, and a second interspersant all of which have a different crystal habit from each other and from the mangano-chromia-manganite. It should also be observed that while it is greatly preferred to add a second interspersant after a drying or calcination step as described, one can instead in forming the catalyst aggregate use two interspersants which are heteromorphic, that is of different crystal habit. More than two can be used in either or both stages.

While it is much preferred, as just stated, that the interspersants all be of different habits, it is possible to make usable and valuable catalyst in which this it not true.

It will be noted that while we speak frequently of a second interspersant this is language adapted to refer to an interspersant added after the drying and calcination. It is not essential that there always be a first interspersant as will be illustrated in the examples. It is also to be observed that when manganese oxide or chromia are used as a second interspersant they can become a part of the spinal phase if the temperatures go high enough in subsequent heat treatments of the catalyst. Such temperatures are usually considerably in excess of those encountered in manufacture or use of the catalyst of the invention so that when added at this stage the manganese oxide or chromia can be regarded as serving primarily as interspersants rather than as part of the spinel phase.

Catalysts prepared as above described can be supported in the ways already well understood in the art. Thus, they can be applied as slurries to conventional supports and heat-treated as will hereinafter be described.

Suitable supports and carriers are:

(1) Porous ceramic spheres, tablets, or rings which have a softening or melting point in excess of 1200° C.
(2) Etched nickel, Nichrome, and Inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules The catalysts can also be applied to such a carrier or support by applying fusible compounds of the manganese, chromium, co-catalyst, and interspersant and fusing as generally above described.

Preferred catalysts of the invention are those which are given increased stability and activity by reason of a unique cooperation between the crystallites in the catalyst aggregate and certain types of supporting materials as illustrated in FIGURE 13 of the drawings.

In FIGURE 13 there is shown an alumina support of high surface area which, as is well known, carries upon its surface a myriad of alumina crystallites illustrated in the figure at 1.

The mangano-chromia-manganite is illustrated showing at 2 a cube containing Mn and Cr lodged among the randomly disposed crystallites, 1. Manganese oxide as shown at 3, and typified by cubes of $Mn_2O_3$, is for the most part comparatively remote from the chromic oxide hexagonal crystallites illustrated at 4 because of the geography of the surface.

In FIGURE 13 alumina is shown as an interspersant at 6 but of course other interspersants can be used as described above. Catalysts which are quite satisfactory can be prepared using a support as described and employing as the catalytic material a mangano-chromia-manganite of the formula $XCr_2O_n \cdot 2YMnO_m$ in which the Mn:Cr ratio is equal to 3:0.5 to 3:2 and 3:3 to 3:30 and in which $n$ can be 2, 3, and 6 and $m$ can be 1, 1.33, 1.5, 2, and 2.5.

Such a catalyst is adapted for use as a catalyst for treating exhaust gases from internal combustion engines.

With a given amount of manganese and chromium one can obtain a catalyst of maximum effectiveness by deploying the compound upon a surface as illustrated. Using larger amounts upon such a surface will not greatly increase catalytic activity.

The refractory is, as illustrated, preferably heteromorphic to the catalyst and so far as practicable to interspersants in the refractory. Among the refractory supports discussed, the following when having appropriate surfaces can advantageously be used:

(1) Bauxite
(2) Zirconia
(3) Titania
(4) Activated alumina

To obtain the effects described, the surface area ought to be at least 10 $M.^2/g.$ with pore dimensions such that 40% are less than 200 angstroms. Surface area and pore diameter are determined by standard methods used in catalysis and elsewhere. It is more preferred that the surface area be at least 80 $M.^2/g.$ with pore dimensions of at least 60% less than 200 angstroms.

The amount of catalysts to apply to such a refractory will depend upon the surface area of the particular refractory selected. Ordinarily the amount will run from about 2% for refractories of comparatively low surface area up to around 20% for refractories of high surface area. It will be evident that there is no great disadvantage to using too much catalyst except that it is wasteful because catalytic efficiency does not rise in proportion to the amount of catalyst used above a certain figure which can readily be determined for a particular catalyst and support.

Catalysts prepared and supported as just described are illustrated in many of the examples such as Examples 27 and 30, and FIGURE 13, in which bauxite is used as the support material. The bauxite as used in those examples has a surface area of about 200 $M.^2/g.$ and approximately 60% of the pores are under 200 angstroms diameter.

Instead of supporting the catalysts as just described, they can be compressed into tablets or pellets. This can be done with conventional pelleting and tableting machinery. A pelleting lubricant should be used, such as powdered graphite or stearic acid. Other conventional lubricants can be used, and the amounts are those normally employed, say 0.1 to 2%, the exact amount being determined in accordance with customary practice.

The heat treatment as illustrated in FIGURE 4 of the drawing results in the product becoming more porous. Volatile matter leaves the catalyst as a result of thermal decomposition and there is, more importantly, a structural orientation which brings the crystallites closer together and leaves larger voids between the groups of crystallites, all as seen in the drawing.

The temperature to be used should be selected to effect this modification, but should not be so high as to result in sintering of the catalyst components. More specifically, temperatures from about 250–800° C. will be satisfactory. The heating must occur for long enough to effect a desired degree of such orientation, and may vary from a few minutes to several hours. At lower temperatures around 250° C. an hour or so may profitably be used and at around 400° C., which is a preferred temperature, about 30 minutes or somewhat less is adequate. At still higher temperatures, times of only 5 or 10 minutes are sufficient.

The catalyst products of the invention can contain widely varying amounts of mangano-chromia-manganite, interspersant, second interspersant, and co-catalyst. In the final product, however, it can generally be stated that the amount by weight of first interspersant plus second interspersant is approximately equal to and can range up to ten times as great as the mangano-chromia-manganite. If co-catalysts are present they will ordinarily amount to from twice as much to one-tenth as much on a molar basis as the mangano-chromia-manganite.

It is to be noted that the life of catalytic aggregates of the invention can be extended by the inclusion of small amounts of an alkali or an alkaline earth. These have the effect of permitting the catalyst to regenerate itself in use through their functioning as a promoter for the re-oxidation of the mangano-chromia-manganite to a higher state of oxidation. Thus, based on the weight of mangano-chromia-manganite, there can be used between 0.05% and 10% of an alkali. The alkalis can include potassium, sodium, lithium, magnesium, calcium, strontium, and barium hydroxides, oxides, or carbonates. The alkali can be added at any appropriate stage in manufacture or after the catalyst has been finished. Again, the alkali can be added to a catalytic support.

The heat-treatment as described ordinarily causes a slight weakening of the pellets or supported catalyst. The temperature at no time goes high enough to result in a sintering which will strengthen the catalyst. The treatment, however, markedly increases the value of the catalyst and particularly increases its resistance to spalling in the presence of liquid water. As a consequence, the catalyst is resistant to water carried by the exhaust gases, to water which it may encounter in storage or in handling, and to water or water solutions which may be used for washing the catalyst to regenerate it after a period of use. Thus, the catalyst can be regenerated by washing with water or by washing with dilute, say around 10%, aqueous solutions of such acids as hydrochloric, nitric, acetic, formic and hydroxy acetic acids or with aqueous solutions or dispersions of catalytically active compounds.

The products of the invention as produced above are characterized by having a crystallite size preferably under 1000 angstroms, preferably under 400, and better under 50, as above described. Additionally the products have the chemical characteristics above described which can be determined by X-ray or by conventional chemical analysis. Additionally the products are porous and will have a surface area by gas adsorption of above 50 $M.^2/g.$ After use the catalysts will still have a comparatively high and effective surface area and the catalyst, after heating to 800° C. for three hours, will still have a surface area by gas adsorption in excess of 2 $M.^2/g.$ Surface area is measured by the BET method.

The catalysts of the present invention can be used in catalytic converters of types already designed including those for use on motor vehicles. Those skilled in the art can readily design a suitable converter which ideally should muffle sound, at least to some extent, and should provide for an adjustable air supply. The muffler in addition to acoustic insulation can also be insulated either interiorally or exteriorally with heat insulation so that the temperatures will reach the light-off temperatures as soon as possible.

While reference has been made herein to the use of the catalysts of the invention particularly for treatment of products of combustion, it will be understood that they can also be used as oxidation and reduction catalysts generally. Thus they can be used for such purposes as hydrogenation of carbon monoxide to higher alcohols and decarboxylation of acids to ketones.

In order that the invention may be better understood, reference should be had to the following illustrative examples.

*Example 1*

(1) Dissolve 165 pounds, 3 pound atoms, of metallic manganese as the nitrate in 750 gallons of water. That is to say, manganese nitrate is used (containing 165 pounds Mn) in amounts of 3 pound moles.

(2) Dissolve also in the same solution containing the manganese nitrate 300 pounds, 3 pound moles of chromic acid anhydride ($CrO_3$).

(3) Adjust the volume to 800 gallons and the temperature to 35° C.

(4) Agitate the solution vigorously while adding vaporized anhydrous ammonia through a diffusion sparger at a rate of two pounds per minute until the precipitation is complete. Further addition of ammonia produces no further precipitate.

(5) Agitate the slurry for one hour then filter in a plate and frame press. Wash the filter cake in situ to remove dissolved salts.

(6) Dry in thin layers at 125°–150° C. for 16 hours.

(7) After drying, calcine the catalyst at 400° C. for three hours after reaching this temperature. Mangano-chromia-manganites thus prepared had a crystallite size of 50 angstroms or less.

(8) Knead a 40 pound lot with 65 pounds of water containing 128 pounds of ammonium chromate. The resulting mangano-chromia-manganite had the formula $XCr_2O_n \cdot 2YMn_nO_m$ in which the ratio of Y:X is 3:12 and $n$ has the values of 2, 3, and 6 and $m$ of 1, 1.33, 1.5, 2, and 2.5. The development of the mangano-chromia-manganite crystals and the values of $n$ and $m$ comes about during the subsequent drying, heating and calcining.

(9) Pulverize, mix with 1% of finely divided graphite and pill on a Stokes BB—2 rotary tableting machine.

(10) Heat the pellets thus obtained in thin layers in an oxidizing atmosphere at 400° C. for three hours. The catalyst pellets as thus prepared can be used in an automobile exhaust, either alone or with other catalysts, for abatement of the exhaust-fume problem.

Mangano-chromia-manganite catalysts as prepared above have crystallites which are largely in the form of cubes. They are very small but if the catalyst as prepared, prior to pelleting, is heated at 600° C. for three hours and then prepared for an electronmicrograph in the usual way, the electronphotomicrograph appears as in FIGURE 14. Substantially all of the discrete particles are cubes.

*Example 2*

Proceed with catalyst preparation as in Example 1 through Step 7 and then follow the following procedure:

(8) Knead 100 pounds of material prepared as above with 65 pounds of water in which is slurried, and partially dissolved, 10 pounds of magnesium oxide.

(9) Dry, pulverize and mix the product thus prepared with 1% of graphite, and pellet.

(10) Heat the pellets thus obtained at 400° C. for three hours. The catalyst pellets thus prepared can be used for fume abatement according to the invention.

*Example 3*

Catalyst preparation proceeded as in Example 1 through Step 7 and then:

(8) Knead 100 pounds of material prepared as above with 65 pounds of water in which there is dissolved 13 pounds of ammonium chromate.

(9) Dry, pulverize and mix with graphite, and pill.

(10) Heat the pellets thus obtained at 400° C. for three hours. Catalyst pellets thus prepared can be used for fume abatement according to the invention.

*Example 4*

Catalyst preparation proceeded as in Example 1 through Step 7 and then:

(8) Knead 100 pounds of material prepared as above with 65 pounds of water in which there is dissolved 10 pounds of magnesium chromate.

(9) Dry, pulverize, mix with graphite, and pill.

(10) Heat the pellets thus obtained at 400° C. for three hours. The catalyst pellets thus prepared can be used for fume abatement according to the invention.

*Example 5*

(1) Dissolve 110 pounds, 2 pound atoms, of metallic manganese as the nitrate in 750 gallons of water. Dissolve also in this same solution 32 pounds, 0.5 pound atom of copper as the nitrate and 30 pounds, 0.5 pound atom, of nickel as the nitrate.

(2) Slurry in this solution 200 pounds of alumina hydrate, 0.5 micron size, low soda content.

(3) Dissolve also, in the same solution containing the manganese and copper nitrates and alumina hydrate, 300 pounds, 3 pound moles, of chromic acid anhydride ($CrO_3$).

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromia-manganites having a crystallite size of about 50 angstroms. The alumina and copper chromite formed are of similar size.

(9) Charge a 100 pound lot produced as above, together with 65 pounds of water in which is dissolved 13 pounds of ammonium chromate into a sigma-arm mixer and knead until the mass is homogeneous and clay-like.

(10) Dry and pulverize the product and mix with 1% of finely divided graphite. Pellet to form 3/16 by 3/16 inch cylindrical tablets.

(11) Heat the pellets in air at 400° C. for three hours to effect structural orientation without significantly increasing the crystallite size of the mangano-chromia-manganite, the alumina, the copper chromite or the chromic oxide contained.

Twenty-five pounds of a product prepared as above and using thirteen ponds of ammonium chromate in Step 9 is placed in a muffler designed for catalytic conversion of exhaust gases of an automobile. An air compressor driven by the car motor supplies about 130% excess, or more, over that stoichiometrically required for the oxidation of the exhaust gases.

The space velocity of the gases varied, depending upon motor speed, betwen 1,000 and 2,000. The light-off temperature of the catalyst is no higher than 260° C. and this temperature is reached initially by operating the motor at a fast idling speed. The catalyst operation continues between 425 and 650° C. It is noted in this connection that operating temperatures around 315 to 370° C. are more nearly ideal for long catalyst life and can be achieved by appropriate heat exchange and insulation of the muffler equipment.

After 341 hours of motor operation at variable speeds the catalyst still effects 80% conversion of the hydrocarbons and more than that conversion of carbon monoxide. Nitrogen oxides were not converted to any great extent. Less than 10% of the catalyst is lost after 341 hours and it is apparently in good physical condition. The catalyst can continue to operate for a longer period.

The catalyst can be used for reduction of nitrogen oxides by appropriate control of operating conditions. If the catalyst temperature is around 515° C. and air is not introduced with the exhaust gases but is added later, then in the reducing section before air addition typical conversions of nitrogen oxides are as follows:

| Parts per Million of Nitrogen Oxides in— ||
|---|---|
| Exhaust Gases Entering Converter | Effluent Gases |
| 630 | 5 |
| 340 | 6 |
| 230 | 11 |
| 310 | 42 |

The catalyst prepared using a larger amount of ammonium chromate in Step 9 leads to similar results.

*Example 6*

Proceed with the catalyst preparation as in Example 5 except that in Step 9 use ten pounds of magnesium chromate instead of the ammonium chromate. The catalyst thus prepared can be used for fume abatement according to the invention. The catalyst is excellent and has a light-off temperature of approximately 230° C.

*Example 7*

Prepare a catalyst as in Example 5 except that in Step 9 use ten pounds of magnesium hydroxide instead of ammonium chromate.

Catalyst pellets prepared according to this procedure can be used for fume abatement as above described.

The catalyst has a light-off temperature of 280° C. After 48 hours of operation at an artificially high temperature of 815° C. it still shows 76% conversion of hydrocarbons.

*Example 8*

(1) Dissolve 110 pounds, 2 pound atoms, of metallic manganese as the nitrate in 75 gallons of water. Dissolve also in the solution 63 pounds, 1 pound atom, of copper as the nitrate.

(2) Slurry 200 pounds of alumina hydrate in the solution.

(3) Dissolve 300 pounds, 3 pound moles, of chromic acid anhydride in the solution.

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromic manganites having a crystallite size of about 50 angstroms. The alumina and copper chromite formed are of similar size.

(9) Charge a 100 pound lot produced as above, together with 65 pounds of water in which is dissolved 13 pounds of ammonium chromate into a sigma-arm mixer and knead until the mass is homogeneous and clay-like. Alternatively a similar product can be made using 33 pounds of ammonium chromate in this step.

(10) Dry and pulverize the product and mix with 1% of finely divided graphite. Pellet to form 3/16 by 3/16 inch cylindrical tablets.

(11) Heat in air at 400° C. for 3 hours.

Catalysts as thus prepared and using 13 pounds of ammonium chromate in Step 9 had a very low light-off temperature with ethane of 145° C. The light-off temperature was 90° C. with 90% conversion with 1% carbon monoxide instead of ethane. They can be used for fume abatement according to the invention. Similar results are obtained using 33 pounds of ammonium chromate in Step 9.

*Example 9*

Proceed as in Example 8 except that in Step 9 use 10 pounds of magnesium chromate instead of the ammonium chromate. The light-off temperature of catalyst pellets thus made is about 250° C. They can be used according to the invention for fume abatement.

*Example 10*

Proceed as in Example 8 except that in Step 9 use 10 pounds of magnesium hydroxide instead of the ammonium chromate. Catalyst pellets thus prepared can be used for fume abatement according to the invention.

*Example 11*

(1) Dissolve 110 pounds, 2 pound atoms, of metallic manganese as the nitrate in 750 gallons of water. Dissolve also in this same solution 32 pounds, 0.5 pound atom, of copper as nitrate and 30 pounds, 0.5 pound atom, nickel as nitrate.

(2) Add 200 pounds of alumina hydrate, 0.5 micron size, to the solution.

(3) Precipitate the manganese, nickel and copper by adding sufficient vaporized anhydrous ammonia to effect complete precipitation as determined by absence of formation of precipitate on addition of further quantities of ammonia.

(4) Add to the slurry 309 pounds, 3 pound moles, of chromium hydroxide powder, Guignet's green.

(5) Stir the slurry for one hour and then filter. Wash the filter cake with water.

(6) Dry the filter cake at 135° C. for one hour.

(7) Raise the temperature of the dried product to 400° C. and calcine at that temperature for one hour to convert the manganate salts to mangano-chromia-manganites having a crystallite size of about 50 angstroms.

(8) Charge a 100 pound lot produced as above, together with 65 pounds of water in which is dissolved water containing 13 pounds of dissolved ammonium-chromate and into a sigma-arm mixer and knead until the mass is homogeneous and clay-like. Alternatively a similar product can be made using 33 pounds of ammonium chromate in this step.

(9) Dry and pulverize the product and mix with 1% of finely divided graphite. Pellet to form 3/16 by 3/16 inch cylindrical tablets.

(10) Heat the pellets in air at 400° C. for three hours to effect structural orientation without significantly increasing the crystallite size of the mangano-chromia-manganite contained. The catalyst as thus prepared can be used in an automobile exhaust for fume abatement.

*Example 12*

Proceed as in Example 11 except that in Step 8 instead of ammonium chromate, dissolve 10 pounds of magnesium chromate in the water used. The catalyst thus prepared can be used for fume abatement according to the invention.

*Example 13*

(1) Dissolve 110 pounds, 2 pound atoms, of metallic manganese as the nitrate in 750 gallons of water. Dissolve also in this same solution 32 pounds, 0.5 pound atom, of copper as the nitrate and 30, 0.5 pound atom, of nickel as the nitrate.

(2) Slurry in this solution 200 pounds of titania. The titania is a pigment-grade of titanium dioxide, rutile form, and having a particle size below 1 micron.

(3) Dissolve in the solution 300 pounds, 3 pound moles, of chromic acid anhydride.

(4) Add water to bring the volume to 800 gallons and heat to raise the temperature to 35° C.

(5) Stir vigorously while adding vaporized anhydrous ammonia through a distributor until precipitation is complete.

(6) Stir the slurry and filter. Wash with water. Dry at 135° C. for two hours.

(7) Calcine at 400° C. for forty-five minutes. Mangano-chromia-manganites contained in products thus prepared have a crystallite size of about 50 angstroms. Similarly, alumina has a crystallite size of about 50 angstroms and the titania has a considerably larger crystallite size and is about 100 to 150 angstroms.

(8) The dried product is kneaded in 65 pounds of water containing 13 pounds of ammonium chromate.

(9) Dry and pulverize the product and mix with a suitable pelleting lubricant such as graphite, stearic acid, or another commonly used pelleting or tableting lubricant.

(10) Heat the pellets in air at 400° C. for thirty minutes. The catalyst as thus prepared can be used in processes of the invention for abating the fume nuisance of automotive vehicles and for similar purposes.

In Step 1 above the manganese nitrate can be replaced with an equal molar amount of manganese acetate manganese chloride, manganese sulfate, or a mixture of any two or more of these. In Step 3, similarly, the chromium can be added using three pound moles of chromium nitrate, chromium chloride, chromium sulfate, or a mixture of any two or more of them.

*Example 14*

(1) Dissolve 110 pounds of metallic manganese as the nitrate, 2 pound atoms, in 750 gallons of water. Also dissolve 60 pounds of iron as the nitrate, 1 pound atom.

(2) To this solution add 200 pounds of alumina hydrate.

(3) Dissolve three pound modules of chromium nitrate in the solution.

(4) Add water to bring the volume to 800 gallons and raise the temperature to 35° C. Stir vigorously while adding finely divided, hydrated calcium hydroxide. This addition is continued until precipitation is complete.

(5) Stir the slurry for one hour and then filter. Wash with water. Dry at 135° C.

(6) Calcine at 400° C. for three hours.

(7) Charge 100 pounds of the product produced as above together with 65 pounds of water containing 13 pounds of ammonium chromate and knead.

(8) Dry and pulverize the product and pellet it.

(9) Heat the pellets in air at 600° C. for three hours. Pellets produced as above can be used in processes of the invention for the abatement of obnoxious and objectionable combustion products.

In the above example, Step 4 instead of using calcium hydroxide as a precipitant, add magnesium hydroxide, barium hydroxide, ammonium chromate, or anhydrous ammonia to effect substantially complete precipitation as described.

*Example 15*

(1) Dissolve 110 pounds, equivalent to 2 pound atoms, of metallic manganese as the nitrate in 750 gallons of water. It is noted that in all of the examples distilled or de-mineralized water should ordinarily be used if local water supplies are at all impure, particularly with respect to metallic impurities. Dissolve also in the same solution 32 pounds of copper as the nitrate and 30 pounds of nickel as the nitrate.

(2) Slurry also in the above solution a slurry prepared by adding 300 pounds of 60% nitric acid to a slurry of 300 pounds of alumina hydrate slurried in 300 gallons of water.

(3) Prepared in a separate vessel a solution of 456 pounds of ammonium chromate prepared by dissolving 300 pounds of chromic acid anhydride in water to which has been added ammonia equivalent to 12 pound moles of anhydrous ammonia.

(4) Transfer the ammoniacal ammonium chromate solution to the vessel in which the manganese, copper, nickel nitrate solutions are being rapidly agitated at 35° C.

(5) Adjust the slurry, if necessary, to obtain complete precipitation by supplementary additions of anhydrous ammonia.

(6) Stir the slurry for one hour and then filter. Wash the filter cake with water. Dry the filter cake at 135° C.

(7) Raise the temperature of the dried product to 400° C. and calcine at that temperature for 30 minutes. The crystallite size of the calcined product was not determined because it was below the range ordinarily measurable by X-ray analytical techniques. Certainly the crystallite size is well below 50 angstroms.

(8) Charge a 100 pound lot produced as above together with 65 pounds of water in which is dissolved 13 pounds of ammonium chromate into a mixer and knead until homogeneous.

(9) Dry, pulverize, and pellet the product.

(10) Heat-treat the pellets in air at 400° C. for one hour. The catalyst as thus prepared can be used in processes of the invention for treatment of the exhaust of motor vehicles.

In the above example, the copper nitrate used in Step 1 can be replaced with a molecularly equivalent amount of nickel nitrate. Similarly, the nickel can be replaced with an equivalent amount of copper nitrate.

The calcination Step 7 above can be effected at temperatures of 350°, 450°, and 500° C. with substantially equivalent results.

Procedures as set out above can be modified by conducting the heat-treatment of Step 10 at 250° C. for five hours or at 800° C. for thirty minutes. The higher temperature results in crystallites of larger size and is less desirable. In this and the other examples, crystallite sizes up to 400 and even 600 angstroms can be reached and have value.

*Example 16*

(1) Dissolve 110 pounds of metallic manganese as the nitrate, 2 pound atoms, in 750 gallons of water. Dissolve also 32 pounds of copper as the nitrate, 0.5 pound atom, and 30 pounds of nickel as the nitrate, 0.5 pound atom.

(2) Dissolve also 300 pounds of chromic acid anhydride, 3 pound moles.

(3) Add water to bring the volume to 800 gallons and raise the temperature to 35° C.

(4) Agitate vigorously while adding vaporized anhydrous ammonia until precipitation is complete.

(5) After precipitation is complete, add to the slurry as a very finely divided powder, 200 pounds of calcium hydroxide. After completion of the addition of the calcium hydroxide, continue the stirring for an additional hour and then filter. Wash the filter cake with water.

(6) Dry the filter cake and then raise its temperature to 500° C. Calcine for thirty minutes. The crystallite size of products prepared in this manner are found to be less than 50 angstroms.

(7) 100 pounds of the product produced as above is charged, together with 65 pounds of water in which was dissolved 13 pounds of ammonium chromate, into a mixer and kneaded.

(8) Dry and pulverize the product and pellet it.

(9) Heat-treat the pellets in air at 400° C. for three hours. A catalyst prepared as just described can be used in processes of the invention.

In Step 5 above, instead of using calcium hydroxide, the same procedure can be followed using the same amount by weight of finely divided titania in rutile or anatase crystal form, thoria, ceria, finely divided chromite ore, magnesium hydroxide, calcium silicate, magnesium aluminate, barium hydroxide, or strontium oxide.

Example 17

(1) Dissolve 110 pounds of metallic manganese as the nitrate, 2 pound atoms, in 750 gallons of water. Dissolve also in this solution 59 pounds of cobalt as the nitrate, 1 pound atom.

Proceed as in Example 5, Steps 2 through 11. Similar results are obtained.

In Step 1 of the procedure, the cobalt nitrate can be replaced by an equimolar amount of copper, nickel, iron, zinc, cadmium, tin, or bismuth sulfate, nitrate, chloride, or acetate with comparable results.

Example 18

(1) Dissolve 110 pounds of metallic manganese as the nitrate in 750 gallons of water. Dissolve also in this same solution 60 pounds of nickel as the nitrate.

(2) Slurry also in this solution 200 pounds of chromium hydroxide, Guignet's green.

(3) Add water to bring the volume to 800 gallons and heat to raise the temperature to 35° C.

(4) Agitate vigorously while adding vaporized anhydrous ammonia until precipitation is complete. Stir the slurry for one hour and filter. Wash the filter cake with water.

(5) Apply filter cake to a refractory support, activated alumina in the form of three to six mesh granules.

(6) Heat in air at 400° C. for two hours. The catalyst as thus prepared can be used for the treatment of combustion gases from hydrocarbon fuels, particularly such as those in diesel installations and power plants.

In the foregoing example, similar catalysts are prepared by using different supports instead of the activated alumina. Thus the procedure as described is followed but the coating is applied to:

(1) Porous ceramic spheres, tablets, or rings of porous ceramic,
(2) Etched nickel, Nichrome, and Inconel wire,
(3) Silica gel,
(4) Silica-alumina,
(5) Alundum,
(6) Pumice,
(7) Diaspore,
(8) Bauxite,
(9) Periclase,
(10) Zirconia,
(11) Titania,
(12) Diatomaceous earth,
(13) Calcium sulfate,
(14) Barium oxide, and
(15) Calcium oxide.

Example 19

(1) Dissolve 110 pounds of metallic manganese as the nitrate in 750 gallons of water. Dissolve also in this same solution 32 pounds of copper as the nitrate and 30 pounds of nickel as the nitrate.

(2) Slurry in this solution 200 pounds of alumina hydrate, 0.5 micron particle size.

(3) Dissolve also in the solution 300 pounds of chromic acid anhydride. Add water to bring the volume to 800 gallons and adjust the temperature to 35° C.

(4) Stir vigorously while adding vaporized anhydrous ammonia until precipitation is complete. Continue to stir the slurry for one hour and then filter. Wash the filter cake with water and dry.

(5) Calcine the dried product at 400° C. for one hour.

(6) Into a sigma-arm mixer charge 100 pounds of the product produced above together with 65 pounds of water in which is dissolved 13 pounds of aluminum oxide as the nitrate. Knead until the mass is homogeneous.

(7) Dry and pulverize the product and pellet it.

(8) Heat the pellets in air at 400° C. for three hours. The heating converts the aluminum nitrate to the oxide.

Under the conditions described the crystallite size of the manganite, the chromite, and the alumina is of the order of 50 angstroms. If the catalyst is heated for an extended time at temperatures around 750° C. or above, there is a growth of particle size up to several hundred angstroms. In the presence of significant quantities of silica the crystallite size will go as high as 400 angstroms or even higher. If the crystallite size is markedly above 400 angstroms, the products produced by such an example are not to be preferred.

Further products of the invention can be made by replacing the aluminum nitrate in Step 6 with a molecularly equivalent weight of hydrous titania gel, thorium nitrate, cerium nitrate, calcium hydroxide, calcium nitrate, calcium acetate, magnesium hydroxide, barium hydroxide and barium nitrate. Molecularly equivalent weights of the following can similarly be used: aluminum alcoholates like the ethylate, butylate, and propylate, zircon powder, aluminum hydroxide gel, zirconia gel, and cerium oxide.

Example 20

(1) Dissolve 165 pounds, 3 pound atoms, of metallic manganese as the nitrate in 750 gallons of water.

(2) Dissolve also in the same solution containing the manganese, 100 pounds, 1 pound mole, of chromic acid anhydride.

(3) Slurry in this solution 200 pounds of alumina hydrate, 0.5 micron size, low soda content.

(4) Add water to bring the volume to 800 gallons and heat to raise the temperature to 35° C.

(5) Agitate vigorously while adding vaporized anhydrous ammonia through a diffusion sparger at two pounds per minute until precipitation is complete as evidenced by no further addition of ammonia producing no further precipitate.

(6) Stir the slurry for one hour and then filter. Wash the filter cake, in situ, with water.

(7) Dry the filter cake at 135° C. for one hour.

(8) Raise the temperature to 400° C. and calcine at that temperature for one hour to convert the manganate salts to mangano-chromia-manganites and the alumina hydrate to alumina, each having crystallite sizes of about 50 angstroms.

(9) Charge a 100 pound lot produced as above, together with 65 pounds of water in which is dissolved 13 pounds of ammonium chromate into a sigma-arm mixer and knead until the mass is homogeneous and clay-like. Alternatively a similar product can be made using 33 pounds of ammonium chromate in this step.

(10) Dry and pulverize the product and mix with 1% of finely divided graphite. Pellet to form $3/16$ by $3/16$ inch cylindrical tablets.

(11) Heat the pellets in air at 400° C. for three hours to effect structural orientation without significantly increasing the crystallite size of the mangano-chromia-manganite, the alumina, or the other crystal species contained. The catalyst can be used for fume abatement.

Example 21

Prepare a catalyst as in Example 20 through Step 8 then proceed according to the following procedure.

(9) Charge an 80 pound lot produced as above together with 20 pounds of a separately prepared copper-nickel chromite ($CuO \cdot CuCr_2O_4$—$NiO \cdot NiCr_2O_4$) and 65 pounds of water in which is dissolved 33 pounds of ammonium chromate into a sigma-arm mixer and knead until the mass is homogeneous and clay-like.

The nickel and copper chromite were prepared as follows:

(a) Dissolve 33 pounds of copper as copper nitrate and 30 pounds of nickel as nickel nitrate in 200 gallons of water.

(b) Dissolve 100 pounds of chromic acid anhydride in the solution prepared in Step a.

(c) Add water to bring the volume to 270 gallons and adjust the temperature to 35° C.

(d) Agitate vigorously while adding vaporized anhydrous ammonia through a diffusion sparger at a rate of one pound per minute until precipitation is complete as evidenced by further addition of ammonia producing no further precipitation.

(e) Agitate the slurry for one hour and then filter. Wash the filter cake with water.

(f) Dry the filter cake at 150° C. for 8 hours.

(g) Raise the temperature of the dried product to 400° C. and calcine at that temperature for one hour to convert the basic chromate salts to chromites having a crystallite size of about 50 angstroms.

(10) Dry for 16 hours at 250° C. then pulverize the product and mix with 1% of finely divided graphite. Pellet to form 3/16 by 3/16 inch cylindrical tablets.

The catalyst as thus prepared can be used directly as in a catalytic muffler for an internal combustion engine. The heat of the gases will effect the desired heat treatment but this is not preferred because the catalyst may incidentally be subjected to liquid water with some damage. It is better before use to heat the catalyst to 250 or 300° C. for three hours.

*Example 22*

(1) Dissolve 110 pounds, 2 pound atoms, of metallic manganese as the nitrate in 750 gallons of water. Dissolve also in this same solution 32 pounds, 0.5 pound atom, of copper as the nitrate and 30 pounds, 0.5 pound atom, of nickel as the nitrate.

(2) Slurry in this solution 200 pounds of alumina hydrate, 0.5 micron size, low soda content.

(3) Dissolve also, in the same solution containing the manganese, nickel and copper nitrates and alumina hydrate, 300 pounds, 3 pound moles, of chromic acid anhydride ($CrO_3$).

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromia-manganite having a crystallite size of about 50 angstroms. The alumina, nickel chromite and copper chromite formed are of similar size.

(9) Charge a 100 pound lot produced as above, together with 65 pounds of water in which is dissolved 33 pounds of ammonium chromate into a sigma-arm mixer and knead until the mass is homogeneous and clay-like.

(10) Dry and then calcine at 300° C. and then pulverize the products and mix with 1% by weight of finely divided graphite. Pellet to form 3/16 by 3/16 inch cylindrical tablets.

(11) Heat the pellets in air at 400° C. for three hours to effect structural orientation without significantly increasing the crystallite size of the mangano-chromia-manganite, the alumina, the copper chromite or the chromic oxide contained.

Thirty-three pounds of a product prepared as above is placed in a muffler designed for catalytic conversion of exhaust gases of an automobile. The muffler is similar to a conventional auto muffler with exhaust intake and outlet and provided with dividing vertical baffles which form transverse chambers into which the catalyst is placed. Cooling tubes carrying ambient air run through the length of the muffler and keep the temperature from becoming excessive. An air compressor driven by the car motor supplies about 30% excess, or more, over that stoichiometrically required for the oxidation of the exhaust gases.

The muffler as described was installed on a 1958 Oldsmobile having a V-8 cylinder engine. This was operated for 15,814 miles over typical terrain encountered in the eastern part of the United States. The light-off temperature of the catalyst as it was applied to the car was about 150° C. Under idling conditions of the motor the CO clean-up was in excess of 90%. Clean-up of olefinic and paraffinic hydrocarbons in the automobile exhaust under idling conditions was also in excess of 90%. The engine was operated at various speeds up to and in excess of 50 miles per hour but at 50 miles per hour a test of the completeness of clean-up of the carbon monoxide olefinic and paraffinic carbons was examined. Under these conditions CO removal was in excess of 95% and a high degree of clean-up was obtained for the hydrocarbons.

The automobile was periodically examined for performance of the catalyst after every thousand miles. At the end of 15,814 miles the light-off temperature was about 250° C. Under idling conditions the carbon monoxide clean-up was in excess of 90% and the hydrocarbon clean-up was in excess of 60%. Also, after this same period of usage the automobile was examined at 50 miles per hour and carbon monoxide clean-up was in excess of 80% and hydrocarbon clean-up was in excess of 80%.

The catalyst was removed from the reactor and examined for lead content and also, by X-ray examination, for the form in which the lead and the catalytic species were present.

In FIGURES 9, 10, 11 and 12 of the drawings there is shown a series of X-ray scans illustrating the composition and character of the catalyst. These scans are somewhat idealized by the draftsman and are on a reduced scale.

FIGURE 9 shows the catalyst of this example as freshly prepared after Step 11 above. The catalyst species and the crystallite size cannot be inferred from the scan because the crystallite size is so small that the scan does not deviate greatly from a straight line and the peaks are very low and represent extremely small particle size. The peaks are not well enough defined to identify the chemical species present. A scan run slowly shows that the crystallite size is extremely fine and is below about 50 angstroms. This is inferred because there are substantially no peaks. It is noted incidentally that electron-micrographs substantiate the small crystallite size and show the crystallites to be about 50–60 angstroms in largest dimension. The surface area of the catalyst at this stage was 49 $M.^2/g.$ and the pore diameter was such that 64% were less than 600 angstroms.

Figure 10:
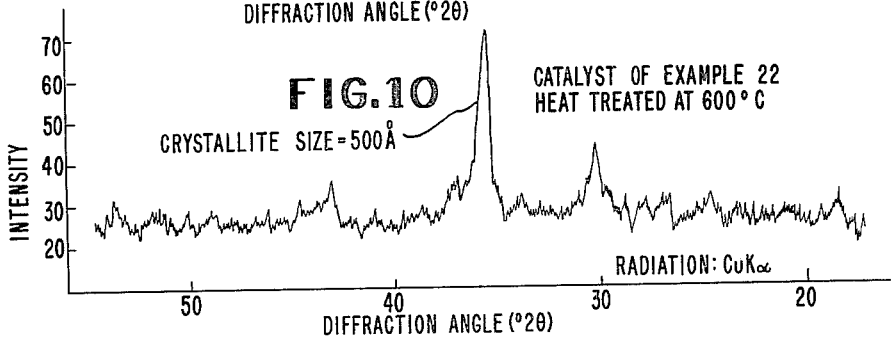

FIGURE 10 is an X-ray scan similar to that of FIGURE 9 but in Step 11 the catalyst was heated to 600° C. for three hours. The crystallite size has increased to a maximum of about 500 angstroms which is still within the invention and the catalyst is a very valuable catalyst for the purposes of the invention. It is to be noted that in identifying the crystallite size in the electron scans we have, for convenience, examined the most prominent peak for $Cr_2O_3 \cdot MnO$ and it has been assumed that other species will follow the same approximate growth pattern. Thus in FIGURE 10 the highest peak is that of the compound just named and this has a breadth indicating a crystallite size no greater than 500 angstroms. Other crystal species other than spinel have a smaller crystallite size. The identity of other peaks can be determined from literature references or can be determined empirically by running a known compound through the same scan. The surface area is 31 $M.^2/g.$ and the pore dimension is such that 25% of the pores are smaller than 600 angstroms in diameter.

FIGURE 11 is a scan of a similar catalyst heated at 800° C. for three hours. The crystallite size of the $Cr_2O_3 \cdot MnO$ species is about 500 angstroms and other peaks representing other crystal species have a particle size somewhat smaller. The surface area is 11 M.²/g. and the pore diameter is such that 9% of the pores are smaller than 600 angstroms.

FIGURE 12 shows a catalyst, prepared ending up at Step 11 above, after 15,814 miles of automobile operation according to the example. New peaks will be seen for lead chromate and it will be seen that the crystallite size has increased to about 250 angstroms but is still below 600 angstroms. The electron microscope substantiates the 250 angstrom figure. The surface area is 25 M.²/g. and the pore diameter is such that 35% of the pores are smaller than 600 angstroms.

*Example 23*

(1) Dissolve 110 pounds, 2 pound atoms, of metallic manganese as the nitrate in 750 gallons of water. Dissolve also in this same solution 32 pounds, 0.5 pound atom, of copper as the nitrate and 30 pounds, 0.5 pound atom, of nickel as the nitrate.

(2) Slurry 300 pounds of alumina hydrate 0.5 micron size low soda content in 200 gallons of water in which is dissolved 150 pounds of nitric acid, 100% $HNO_3$. This nitric acid solution with an alumina hydrate suspension is heated to the boiling point and maintained at this temperature for 3 hours. It is then cooled to 50° C. and added to the nitrate solution described in item 1. The heat treatment converts at least a portion of the alumina to the boehmite crystal form and in the form of small colloidal platelets.

(3) Dissolve also, in the same solution containing the manganese and copper nitrates and alumina hydrate, 300 pounds, 3 pound moles, of chromic acid anhydride ($CrO_3$).

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromia-manganite having a crystallite size of about 50 angstroms. The crystallites of the alumina, and of the copper and nickel chromites formed, are of similar size.

(9) Charge a 100 pound lot produced as above, together with 65 pounds of water in which is dissolved 10 pounds of magnesium acetate into a sigma-arm mixer and knead until the mass is homogeneous and clay-like.

(10) Dry and pulverize the product and mix with 1% of finely divided graphite. Pellet to form 3/16 by 3/16 inch cylindrical tablets.

(11) Heat the pellets in air at 400° C. for three hours to effect structural orientation without significantly increasing the crystallite size of the mangano-chromia-manganite, the alumina, the copper chromite or the chromic oxide contained.

The crystallite size of crystallites in the product was less than 50–60 angstroms and this product had a small crystallite size even after extended heating at 800° C. This is shown by X-ray examination which shows the crystallite size after three hours at 800° C. to be under 500 angstroms. This catalyst has very high activity even after extended heating.

*Example 24*

The series of steps described above in Example 22 were followed exactly except that Step 2 was as follows:

(2) Slurry in the above solution 200 pounds of a silica aerogel having a particle size below one-half micron. There can be used instead an equal weight of aerogel of the Kistler Patent 2,093,454 or of a fumed product made by volatilizing silicon chloride and hydrolyzing. Alternatively silica sols can be used to introduce an equivalent weight of silica of colloidal size such as those sols shown in Bechtold and Snyder 2,574,902, Rule 2,577,484, Davison's Legal Patent 2,724,701, and Monsanto's White Patent 2,375,738.

The catalyst produced according to this example can be used as are the others of the invention but it finds its principal utility when used at temperatures no higher than about 700° C.

*Example 25*

(1) Charge 500 pounds of 4 to 8 mesh activated alumina to a cylindrical vessel which is completely closed except for valved openings at the bottom and top of the vessel.

(2) Force superheated steam at 150 to 250° C. through the bed of activated alumina until the entire bed of activated alumina is above 125° C.

(3) In a separate vessel prepare, and adjust to 30° C., 1,000 gallons (sufficient to completely fill the vessel of item 1 and all interconnecting piping) of an aqueous solution composed of 3,000 parts water, 110 parts manganese as the nitrate, 33 parts copper as the nitrate, 30 parts of nickel as nitrate, and 300 parts chromic acid anhydride, $CrO_3$.

(4) After the activated alumina has been uniformly heated to above 125° C. close the exit port of the vessel containing the alumina and then simultaneously close the inlet steam valve and open the valve admitting the solution prepared in item 3 above.

(5) As the temperature in the vessel drops below the point at which condensation of the steam atmosphere takes place, the solution will be drawn into the vessel and into the interstices and pores of the activated alumina.

(6) After the solution has remained on the granules for 10 minutes, open the top port and drain the excess solution from the granules.

(7) Feed into the granules a gaseous mixture composed of 3% anhydrous ammonia in nitrogen until there is no further reaction of ammonia with the granules and with the adsorbates on the granules. This point can be determined both by lack of temperature rise as the gases pass through the granules and by the breakthrough of ammonia in the exit gas. The temperature of the incoming gas mixture and the percentage of ammonia in the gas can be varied to control the temperature of the granules within the range of 40–70° C.

(8) Stop the flow of ammonia-nitrogen mixed gas and feed heated air to the vessel. Raise the temperature of the granules to 300° to 400° C. and maintain this range for one hour. The off-gas from the vessel can be processed for the recovry of valuable salts and dust evolved from the granules during this calcination.

(9) Discharge the impregnated and calcined granules. Catalyst prepared according to this example is useful for fume abatement.

A simular catalyst can be made in which the activated alumina is first treated with an aqueous solution of potassium carbonate containing 2 grams of potassium carbonate per liter. Thereafter the excess potassium carbonate solution is drained off and the granules are dried to leave the potassium carbonate on the surface. The remainder of the process of the above example can be followed just as shown.

Instead of using the indicated amount of potassium carbonate similar results can be obtained using sodium carbonate, lithium carbonate, calcium hydroxide, barium hydroxide, and other alkalis shown above, the amounts in each instance being those just indicated.

*Example 26*

(1) Dissolve 275 pounds, 5 pound atoms, of metallic manganese as the nitrate in 750 gallons of water. Dissolve also in this same solution 32 pounds, 0.5 pound atom, of copper as the nitrate and 30 pounds, 0.5 pound atom, of nickel as the nitrate.

(2) Dissolve also in the same solution 200 pounds, 2 pound moles, of chromic acid anhydride ($CrO_3$).

(3) Add water to bring the volume to 800 gallons and heat to raise the temperature to 35° C.

(4) Agitate vigorously while adding vaporized anhydrous ammonia through a distributor at two pounds per minute until precipitation is complete as evidenced by further addition of ammonia producing no further precipitation.

(5) Stir the slurry for one hour and then filter. Wash the filter cake with water.

(6) Dry the filter cake at 135° C. for one hour.

(7) Raise the temperature of the dried product to 400° C. and calcine at that temperature for one hour to convert the manganese salts to mangano-chromia-manganites having a crystallite size of about 50 angstroms. As the same time the calcination converts manganese hydroxide to manganese oxides which serve as potential components of the ionic crystals and lend desired properties. These are present because an excess of manganese is used in Step 1 over that required to form manganese chromite of Mn:Cr ratio of 3:2. The calcination also converts the basic nickel and copper chromates to chromites.

(8) Charge a 100 pound lot produced as above, together with 65 pounds of water in which is dissolved 40 pounds of anhydrous aluminum nitrate into a sigma-arm mixer and knead until the mass is homogeneous and clay-like.

(9) Dry the product and calcine at 400° C. for 2 hours to decompose the nitrate and form aluminum oxide, pulverize and mix with 1% of finely divided graphite. Pellet to form ⅛ by ⅛ inch cylindrical tablets.

(10) Heat the pellets in air at 400° C. for 3 hours to effect structural orientation.

The product prepared as above can be used effectively for the catalytic conversion of exhaust gases of an automobile. Like many other of the example catalysts, this is particularly good for use at high temperature and has a very low light-off temperature. It can accordingly be used to raise the temperature of exhaust gases of an automobile to make them more suitable for conversion in a conventional catalytic muffler or other device.

Catalysts of similar utility and character can also be made replacing in Step 8 the aluminum nitrate there used with the same weight of thorium nitrate, cerium nitrate, magnesium nitrate, lanthanum nitrate, and any other of the interspersants above described.

*Example 27*

(1) 250 parts by weight of chromic acid anhydride and 140 parts by weight of $NH_3$ are dissolved in 610 parts by weight of water.

(2) A second solution is made containing 77 parts by weight of manganese as manganese nitrate and 923 parts by weight of water.

(3) 300 parts by weight of activated bauxite of 4 to 8 mesh granules is placed in a perforated basket and dipped into the solution prepared in item 1 above. It is then removed, drained for three minutes and then dipped into the solution described in item 2 above. After remaining in the solution for about 1 minute the basket is removed and the bauxite is drained and dried. It is noted that the activated bauxite is an article of commerce which is prepared by heating bauxite ore under oxidizing conditions.

(4) The dried granules are then heated to 250° C. for 30 minutes. They are then cooled. The catalyst thus prepared has a ratio Mn:Cr of 3:5.2. It is to be noted that the Mn:Cr ratio is that of the reactants used because unlike aqueous precipitations there is no loss of chromium during the processing. The catalyst is useful for oxidation and reduction reactions at elevated temperatures and is particularly useful for the treatment of automobile exhaust gases. The catalyst of this example is illustrated in FIGURE 13.

*Example 28*

A procedure was followed as in Example 27 except for the following differences:

(1) The first solution—100 parts of chromic acid anhydride and 28 parts of $NH_3$ are dissolved in 886 parts of water.

(2) 220 parts of manganese as manganese nitrate are dissolved in 780 parts by weight of water.

(4) The catalyst produced carries a mangano-chromia-manganite having an Mn:Cr ratio of 3:0.75.

*Example 29*

Catalysts are prepared as in Examples 27 and 28 above but making the following changes in the numbered items:

(1) In the first solution in each of Examples 27 and 28 there is included an additional 100 parts by weight of chromic acid to supply the chromium required for the copper and nickel chromites to be formed.

(2) To the second solution there is added 25 parts by weight of copper as copper nitrate and 20 parts by weight of nickel as nickel nitrate.

Other co-catalysts as described above can similarly be used in the second solution.

(3b) The dried catalyst is then calcined at 250° C. for 30 minutes. The resulting catalysts are suitable for use in oxidation and reduction reactions and especially for treating automobile exhaust gases. Instead of the final calcination one can instead rely upon the heat present in the catalytic reactor as is, of course, true in the numerous examples above, but it is ordinarily preferred to effect the calcination as here described.

If the product is to be used in an automobile exhaust muffler without prior calcination, it would be preferred to use the acetate of the interspersant rather than the nitrate and, of course, other salts which would give unobjectionable products of combustion can be used as can colloids which do not need to decompose further such as alumina sols.

Any of the interspersants above described can, of course, be used in this last step in amounts as already taught above.

It will also be understood that in following the procedure of the present example, the first interspersant as described in Example 30 can be omitted so that only the interspersant of Step 3a is used.

It is further to be understood that in any of Examples 27 through 31 one can use the same weight of any of the other supports previously described. Thus the procedure as shown in the examples can be carried out using the indicated weight of Alundum as granules, activated alumina as granules, and titania granules.

*Example 30*

Catalysts are prepared as in Examples 27, 28, and 29 above but inserting the following steps after item 3:

(3a) A third solution is prepared using 54 parts by weight of aluminum as aluminum nitrate dissolved in 946 parts by weight of water. The drained catalyst from item 3 is placed in this third solution for 1 minute, removed, and drained before the drying step described above.

It will be understood that instead of using aluminum nitrate—which results in aluminum oxide as an interspersant—there can instead be used any of the other interspersants described above. These can of course be added as colloids or as heat decomposable salts.

*Example 31*

The processes of each of Examples 27, 28, 29, and 30 can be modified by the addition of an interspersant after calcination. This can be done by inserting in the sequence of items given in each of the foregoing examples the following:

(4a) A solution is prepared by dissolving 69 parts by weight of barium as barium nitrate in 931 parts by weight of water. The calcined catalyst from the preceding step is dipped into this solution, allowed to remain for 1 minute, removed, drained and dried.

*Example 32*

(1) 165 parts by weight of manganese as the nitrate, 600 parts by weight of chromic acid anhydride, 500 parts by weight of aluminum hydrate as finely divided powder, 28 parts by weight of nickel as the nitrate, and 31 parts by weight of copper as the nitrate, are all dry-mixed together.

(2) The mixture is agitated and simultaneously heated and a reducing gas composed of hydrogen and CO diluted with nitrogen is fed to the mixing area and the fusion is continued until the mass has finished reacting and has solidified.

(3) The solidified product is cooled, crushed, and screened to produce a catalyst particularly useful for treatment of automobile exhaust gases.

*Example 33*

A catalyst was prepared as in Example 32 with the exception that prior to the heating of Step 2, 7000 parts by weight of alumina as 4 to 8 mesh activated granules is also incorporated into the mixture to act as a support material.

We claim:

1. A catalyst of the character described having the empirical formula:

$$XCr_2O_n \cdot 2YMnO_m$$

where
the ratio of $Y:X = 3:0.5$ to $3:1.5$ and $3:3.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$.

2. The catalyst of claim 1 in which crystallites of the said catalyst are mixed with and kept apart by crystallites of a refractory oxide which melts above 1000° C. selected from the group consisting of oxides of aluminum, titanium, thorium, cerium, magnesium, calcium, barium, strontium, zinc, manganese, silicon, beryllium, zirconium, lanthanum and hafnium.

3. A composition as in claim 2 in which the chromium oxide-manganese oxide complex has a crystallite size of less than 1000 angstroms and in which the refractory crystallites are of similar size.

4. A composition of claim 3 which additionally contains a second refractory oxide which melts above 1000° C. from the class already described but which is of similar size but which is of a different crystal habit from the said first refractory.

5. A composition of claim 4 which additionally contains as a co-catalyst a chromite of a metal selected from the group consisting of copper, nickel, iron, zinc, cadmium, cobalt, tin, and bismuth, the crystallites of said chromite being of similar size to those of the refractory and catalyst.

6. A catalyst of the character described having the empirical formula:

$$XCr_2O_n \cdot 2YMnO_m$$

where
the ratio of $Y:X = 3:05$ to $3:1.5$ and $3:3.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$, the catalyst having a crystallite size less than 1000 angstroms.

7. The catalyst of claim 6 wherein the crystallite size is less than 400 angstroms.

8. A catalyst of the character described having the empirical formula:

$$XCr_2O_n \cdot 2YMnO_m$$

where
the ratio of $Y:X = 3:0.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$, crystallites of the said catalyst being mixed with and kept apart by crystallites of a refractory oxide which melts above 1000° C. selected from the group consisting of oxides of aluminum, titanium, thorium, cerium, magnesium, calcium, barium, strontium, zinc, manganese, silicon, beryllium, zirconium, lanthanum and hafnium.

9. A composition of claim 8 coated upon a catalyst support selected from the group consisting of porous ceramic shapes, etched nickel, nichrome, and Inconel wire, alundum, pumice, diaspore, bauxite, periclase, zirconia, titania, diatomaceous earth, calcium sulfate, barium oxide, calcium oxide, and activated alumina granules.

10. A catalyst of the character described having the empirical formula:

$$XCr_2O_n \cdot 2YMnO_m$$

where
the ratio of $Y:X = 3:0.5$ to $3:1.5$ and $3:3.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$, the catalyst being made up of ionic crystals of a shifting, spinel-like character.

11. A process for the preparation of a catalyst suitable for treatment of combustion gases comprising precipitating in an aqueous medium a complex of the empirical formula:

$$XCr_2O_n \cdot 2YMnO_m$$

where
the ratio of $Y:X = 3:0.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$, and coprecipitating with said complex a refractory which melts above 1000° C. selected from the group consisting of oxides and hydroxides of aluminum, titanium, thorium, cerium, magnesium, calcium, barium, strontium, zinc, manganese, silicon, beryllium, zirconium, lanthanum and hafnium.

12. The process for the preparation of a catalyst suitable for the treatment of combustion gases comprising coprecipitating a complex having the empirical formula:

$$XCr_2O_n \cdot 2YMnO_m$$

where
the ratio of $Y:X = 3:0.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$, together with a chromite of a metal selected from the group consisting of copper, nickel, iron, zinc, cadmium, cobalt, tin, and bismuth and with a refractory selected from the group consisting of oxides and hydroxides of aluminum, titanium, thorium, cerium, magnesium, calcium, barium, strontium, zinc, manganese, silicon, beryllium, zirconium, lanthanum and hafnium, calcining said precipitate at a temperature from 350° to 500° C., then mixing with another of the refractories above recited, pelleting, and heat treating at 250° to 800° C.

13. In a process for the preparation of a catalyst suitable for treatment of combustion gases the steps comprising precipitating in an aqueous medium a complex having the empirical formula:

$$XCr_2O_n \cdot 2YMnO_m$$

where
the ratio of $Y:X = 3:0.5$ to $3:30$,
$n = 2, 3,$ and $6$,
$m = 1, 1.33, 1.5, 2,$ and $2.5$,
the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$, coprecipitating together with said complex of a refractory which melts above 1000° C. selected from the group consisting of oxides and hydroxides of aluminum, titanium, thorium, cerium, magnesium, calcium, barium, strontium, zinc, manganese, silicon, beryllium, zirconium, lanthanum and hafnium in colloidal form, calcining said coprecipitate, pelleting, and then heat treating at 250° to 800° C.

14. A process of claim 13 in which the refractory is of a different crystal system from the chromium oxide-manganese oxide complex.

15. A process of claim 13 in which between the calcination and pelleting steps a second refractory of the group named is added in colloidal form before the pelleting operation.

16. A process of claim 15, the two refractories and the chromium oxide-manganese oxide all being of different crystal systems.

References Cited by the Examiner
UNITED STATES PATENTS

| | | | |
|---|---|---|---|
| 1,964,001 | 6/34 | Lazier | 252—467 X |
| 1,995,274 | 3/35 | Eversole | 252—465 X |
| 2,025,140 | 12/35 | Wenzel | 23—2 |
| 2,031,475 | 2/36 | Frazier | 23—2 |
| 2,071,119 | 2/37 | Harger | 252—463 X |
| 2,108,156 | 2/37 | Wortz | 252—467 X |
| 2,265,682 | 12/41 | Bennett et al. | 252—458 X |
| 2,374,149 | 4/45 | Whitman. | |
| 2,855,370 | 10/58 | Lundsted | 252—467 |
| 2,910,444 | 10/59 | Cramer | 252—467 |

MAURICE A. BRINDISI, *Primary Examiner.*